(12) United States Patent
Yamaguchi

(10) Patent No.: US 7,869,911 B2
(45) Date of Patent: Jan. 11, 2011

(54) VEHICLE CONTROL UNIT AND VEHICLE CONTROL METHOD

(75) Inventor: Kazuhi Yamaguchi, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 1030 days.

(21) Appl. No.: 11/653,940

(22) Filed: Jan. 17, 2007

(65) Prior Publication Data

US 2007/0170778 A1 Jul. 26, 2007

(30) Foreign Application Priority Data

Jan. 20, 2006 (JP) ............................. 2006-012636

(51) Int. Cl.
*B60L 9/00* (2006.01)
*B60L 11/00* (2006.01)

(52) U.S. Cl. ............................. 701/22; 701/36; 180/65; 180/25; 903/903

(58) Field of Classification Search ................... 701/22, 701/36; 307/10; 180/6.48, 65.1; 318/139, 318/432; 290/45; 903/903
See application file for complete search history.

(56) References Cited

U.S. PATENT DOCUMENTS

| 4,598,373 | A | | 7/1986 | Morishita et al. |
| 5,561,363 | A | | 10/1996 | Mashino et al. |
| 6,158,537 | A | * | 12/2000 | Nonobe ........................ 429/431 |
| 6,554,088 | B2 | * | 4/2003 | Severinsky et al. ....... 180/65.23 |

(Continued)

FOREIGN PATENT DOCUMENTS

CN 101428610 A * 5/2009

(Continued)

OTHER PUBLICATIONS

A maximum power transfer battery charger for electric vehicles; Masserant, B.J.; Stuart, T.A.; Aerospace and Electronic Systems, IEEE Transactions on; vol. 33 , Issue: 3; Digital Object Identifier: 10.1109/7.599313; Publication Year: 1997 , pp. 930-938.*

(Continued)

*Primary Examiner*—Cuong H Nguyen
(74) *Attorney, Agent, or Firm*—Oliff & Berridge, PLC

(57) ABSTRACT

A battery supplies electric power to electric equipments of the vehicle. An alternator generates the electric power and charges the battery when an engine of the vehicle is operated. An economical running control section is operable to perform an economical running in which the engine is automatically stopped when the vehicle is in a predetermined engine stopping condition and the engine is automatically restarted when the vehicle is in a predetermined engine restarting condition. A calculate section is operable to calculate an available current value which is available to supply to the electric equipments from the battery. A feed limiting section is operable to limit to supply the electric power to the electric equipments from the battery. The economical running control section controls the economical running based on a total value of necessary current values which are necessary for the respective electric equipments and the available current value. The feed limiting section limits to supply the electric power to the electric equipments from the battery based on the total value of the necessary current values and the sum of the available current value and a generated current value of the alternator.

13 Claims, 11 Drawing Sheets

U.S. PATENT DOCUMENTS

| | | | |
|---|---|---|---|
| 6,570,266 B1* | 5/2003 | Wakashiro et al. | 290/40 C |
| 6,694,232 B2* | 2/2004 | Saito et al. | 701/22 |
| 6,727,670 B1* | 4/2004 | Grabowski et al. | 318/432 |
| 6,739,418 B2* | 5/2004 | Ogata et al. | 180/65.245 |
| 6,781,251 B2* | 8/2004 | Takaoka et al. | 290/40 C |
| 7,031,822 B1* | 4/2006 | Hashimoto et al. | 701/103 |
| 7,073,615 B2* | 7/2006 | Mack | 180/65.235 |
| 7,216,729 B2* | 5/2007 | Syed et al. | 180/65.28 |
| 7,407,026 B2* | 8/2008 | Tamor | 180/65.28 |
| 7,522,978 B2* | 4/2009 | Minkowitz et al. | 701/19 |
| 2002/0019687 A1* | 2/2002 | Suzuki et al. | 701/22 |
| 2006/0021809 A1* | 2/2006 | Xu et al. | 180/65.2 |
| 2006/0058932 A1* | 3/2006 | Garg et al. | 701/29 |
| 2006/0241826 A1* | 10/2006 | Ishishita et al. | 701/22 |
| 2007/0112496 A1* | 5/2007 | Ji | 701/70 |
| 2009/0218987 A1* | 9/2009 | Tominaga | 320/134 |
| 2010/0017054 A1* | 1/2010 | Okubo et al. | 701/22 |
| 2010/0063658 A1* | 3/2010 | Martin et al. | 701/22 |

FOREIGN PATENT DOCUMENTS

| | | |
|---|---|---|
| DE | 195 14 738 A1 | 10/1995 |
| EP | 1 405 768 A1 | 4/2004 |
| GB | 2 087 605 A | 5/1982 |
| JP | 10201009 A * | 7/1998 |
| JP | A 10-325346 | 12/1998 |
| JP | A 2001-4724 | 1/2001 |
| JP | A 2001-173480 | 6/2001 |
| JP | A 2001-341596 | 12/2001 |
| JP | A 2002-31671 | 1/2002 |
| JP | A 2004-42799 | 2/2004 |
| JP | A 2004-92524 | 3/2004 |
| JP | A 2004-106621 | 4/2004 |
| JP | 2005295772 A * | 10/2005 |
| JP | 2006094626 A * | 4/2006 |
| JP | 2006141156 A * | 6/2006 |
| JP | 2007138720 A * | 6/2007 |
| JP | 2009298301 A * | 12/2009 |
| WO | WO 02/087053 A1 | 10/2002 |

OTHER PUBLICATIONS

Fuzzy control to improve high-voltage battery power and engine speed control in a hybrid electric vehicle; Syed, F.U. et al.; Fuzzy Information Processing Society, 2005. NAFIPS 2005. Annual Meeting of the North American; Digital Object Identifier: 10.1109/NAFIPS.2005.1548559; Publication Year: 2005 , Page(s).*

Control of fuel cell/battery/supercapacitor hybrid source for vehicle applications; Thounthong, P.; et al.; Industrial Technology, 2009. ICIT 2009. IEEE International Conference on; Digital Object Identifier: 10.1109/ICIT.2009.4939566; Publication Year: 2009 , pp. 1-6.*

Energy Storage Systems for Automotive Applications; Lukic, S.M. et al. ; Industrial Electronics, IEEE Transactions on vol. 55 , Issue: 6; Digital Object Identifier: 10.1109/TIE.2008.918390; Publication Year: 2008 , pp. 2258-2267.*

Kinetic energy storage for vehicles; Pullen, K.R.; Ellis, C.W.H.; Hybrid Vehicle Conference, IET The Institution of Engineering and Technology, 2006; Publication Year: 2006 , pp. 91-108.*

Flywheel and supercapacitor peak power buffer technologies; Mellor, P.H.; Schofield, N.; Howe, D.; Electric, Hybrid and Fuel Cell Vehicles (Ref. No. 2000/050), IEE Seminar; Digital Object Identifier: 10.1049/ic:20000268; Publication Year: 2000 , pp. 8/1-8/5.*

The development of fuel cell medium bus; Jie Zeng; Liyan Zhang; Feng Kong; Yuhua Zhang; Industrial Technology, 2008. ICIT 2008. IEEE International Conference on; Digital Object Identifier: 10.1109/ICIT.2008.4608526; Publication Year: 2008 , pp. 1-5.*

Analysis of the battery performance in hybrid electric vehicle for different traction motors; Sen, C.; Kar, N. C.; Electrical Power & Energy Conference (EPEC), 2009 IEEE; Digital Object Identifier: 10.1109/EPEC.2009.5420378; Publication Year: 2009 , pp. 1-6.*

Impact-analysis of the charging of plug-in hybrid vehicles on the production park in Belgium; Geth, F.; Willekens, K.; Clement, K.; Driesen, J.; De Breucker, S.; MELECON 2010—2010 15th IEEE Mediterranean Electrotechnical Conference; Digital Object Identifier: 10.1109/MELCON.2010.5476243; Publication Year: 2010 , pp. 425-430.*

High-performance battery-pack power estimation using a dynamic cell model; Plett, G.L.; Vehicular Technology, IEEE Transactions on; vol. 53 , Issue: 5; Digital Object Identifier: 10.1109/TVT.2004.832408; Publication Year: 2004 , pp. 1586-1593.*

High Efficient Intelligent Motor Control for a Hybrid Shunting Locomotive; Asaei, B.; Amiri, M.; Vehicle Power and Propulsion Conference, 2007. VPPC 2007. IEEE; Digital Object Identifier: 10.1109/VPPC.2007.4544160; Publication Year: 2007 , pp. 405-411.*

* cited by examiner

| FLUID TEMPERATURE OF BATTERY (°C) | -50 | -25 | 0 | 25 | 50 | 75 |
|---|---|---|---|---|---|---|
| INTERNAL RESISTANCE VALUE (mΩ) | 13 | 10 | 7 | 5 | 3 | 2 |

FIG. 13

PRIORITY TABLE 46

| DESIGNATIONS | PRIORITIES | CONSUMED CURRENT VALUES |
|---|---|---|
| AAA | HIGH | 10 |
| BBB | MEDIUM | 50 |
| CCC | MEDIUM | 20 |
| DDD | HIGH | 15 |
| EEE | LOW | 25 |
| FFF | LOW | 35 |
| GGG | MEDIUM | 42 |
| HHH | MEDIUM | 35 |
| III | HIGH | 46 |
| JJJ | LOW | 12 |

VEHICLE CONTROL UNIT AND VEHICLE CONTROL METHOD

The disclosures of Japanese Patent Application No. 2006-012636 filed on Jan. 20, 2006 including specification, drawings and claims are incorporated herein by reference in its entirety.

BACKGROUND OF THE INVENTION

The present invention relates to a vehicle control unit and a vehicle control method, and more particularly to a vehicle control unit and a vehicle control method for controlling a vehicle having a battery which supplies electric power to electric equipments of the vehicle and an alternator which generates the electric power and charges the battery when an engine of the vehicle is operated and an economical running control section operable to perform an economical running in which the engine is automatically stopped when the vehicle is in a predetermined engine stopping condition and the engine is automatically restarted when the vehicle is in a predetermined engine restarting condition.

There are vehicles on which an economical running system is installed. The economical running system is operable to perform the economical running in which the engine is automatically stopped when the vehicle is in a predetermined engine stopping condition and the engine is automatically restarted when the vehicle is in a predetermined engine restarting condition.

In addition, there are vehicles on which a plurality of electric equipments is installed. The electric equipments include accessories such as an on-board car audio system, and safety system units such as an ABS (Anti-Lock Braking System) for preventing the car from slip by sustained wheel-locking when the vehicle is suddenly braked or the vehicle is braked on a slippery road surface, a braking assist system for assisting a braking force so as to obtain a strong braking force when the vehicle is suddenly braked, and a pre-crash safety system in which a distance to an object from the vehicle is measured by a radar and when a collision is inevitable, the auxiliary brake is applied and occupants of the vehicle are restrained by retracting the seatbelts before the collision occurs.

In the above related-art vehicle, there is a vehicle on which a power supply management system is installed. When a current value which is supplied to the electric equipments becomes insufficient, the power supply management system performs a feed limitation on the accessories so as to securely feed to the safety system in view of safety.

In the power supply management system, for example, the consumption of the electric power by the electric equipments is equally suppressed in order to reduce the consumption of the electric power when an economical running is performed in a case where the charged level of the battery is low or the economical running is performed a number of times (refer, for example, to Japanese Patent Publication No. 2004-106621). When the economical running is performed, an engine of the vehicle is activated in a case where an ignition switch is on, the vehicle is in idling-stop state, and a predetermined condition is established is performed.

When the electric equipments such as the accessories and safety system units are used for a long period of time in a state that the engine is stopped and the alternator generates no current since the economical running is performed, the available current value of the battery is surely at a lower level than before the economical running is performed. Therefore, the feed limitation on the accessories other than the safety system units easily occurs at all times depending on the condition of the battery when the vehicle is restored to the normal state from the economical running state.

Here, when a feed limitation on the accessories is implemented due to the current value supplied to the electric equipments becoming insufficient, since the available current value that can be supplied to the electric equipments from the battery cannot be calculated accurately, the current value that can be so supplied is estimated lower. Therefore, the feed limitation on the accessories is implemented more than actually necessary. By such a feed limitation, the feed on the accessory on which the feed limitation did not actually have to be performed may be limited. Then, there is a problem that a reproduction of musing was stopped while the user was listening thereto, the conveniences of the user being thereby damaged.

SUMMARY OF THE INVENTION

It is therefore an object of the invention to provide a system and method of controlling a vehicle which can reduce the occurrence of feed limitation on the accessories.

In order to achieve the above described object, according to the invention, there is provided a vehicle control unit adapted to be mounted on a vehicle having a battery which supplies electric power to electric equipments of the vehicle and an alternator which generates the electric power and charges the battery when an engine of the vehicle is operated and an economical running control section operable to perform an economical running in which the engine is automatically stopped when the vehicle is in a predetermined engine stopping condition and the engine is automatically restarted when the vehicle is in a predetermined engine restarting condition, the vehicle control unit comprising:

a calculate section, operable to calculate an available current value which is available to supply to the electric equipments from the battery; and a feed limiting section, operable to limit to supply the electric power to the electric equipments from the battery, wherein:

the economical running control section controls the economical running based on a total value of necessary current values which are necessary for the respective electric equipments and the available current value; and the feed limiting section limits to supply the electric power to the electric equipments from the battery based on the total value of the necessary current values and the sum of the available current value and a generated current value of the alternator.

According to the invention, there is also provided a vehicle control method for controlling a vehicle having a battery which supplies electric power to electric equipments of the vehicle and an alternator which generates the electric power and charges the battery when an engine of the vehicle is operated and an economical running control section operable to perform an economical running in which the engine is automatically stopped when the vehicle is in a predetermined engine stopping condition and the engine is automatically restarted when the vehicle is in a predetermined engine restarting condition, the vehicle control method comprising:

calculating an available current value which is available to supply to the electric equipments from the battery;

controlling the economical running based on a total value of necessary current values which are necessary for the respective electric equipments and the available current value; and limiting to supply the electric power to the electric equipments from the battery based on the total value of the necessary current values and the sum of the available current value and a generated current value of the alternator.

According to the invention, there is also provided a vehicle control unit adapted to be mounted on a vehicle having a battery which supplies electric power to electric equipments of the vehicle, the vehicle control unit comprising:

a priority table which indicates a priorities of the respective electric equipments in which the electric power is supplied to the respective electric equipments from the battery;

a feed limiting section, operable to limit to supply the electric power to the electric equipments from the battery based on the priority table.

According to the invention, there is also provided a vehicle control unit adapted to be mounted on a vehicle having a battery which supplies electric power to electric equipments of the vehicle and an alternator which generates the electric power and charges the battery when an engine of the vehicle is operated, the vehicle control unit comprising:

a calculate section, operable to calculate a generated voltage value of the alternator based on a revolution of the engine;

an acquiring section, operable to acquire a correction coefficient based on an internal resistance value of the battery; and a correction section, operable to correct the generated voltage value based on the correction coefficient.

With the above configurations, the available current value which the battery can supply to the electric equipments is accurately calculated. Since the economical running is performed based on the available current value and a feed limitation to the electric equipments from the battery is performed based on the total value of the necessary current values and the available current value, an unreasonable feed limitation of the electric equipment other than the safety system units can be reduced, thereby making it possible to enhance the conveniences of the user.

BRIEF DESCRIPTION OF THE DRAWINGS

The above objects and advantages of the present invention will become more apparent by describing in detail preferred exemplary embodiments thereof with reference to the accompanying drawings, wherein:

FIG. 13 is a diagram showing a priority table.

DETAILED DESCRIPTION OF THE EMBODIMENTS

Hereinafter, an embodiment of the invention will be described in detail with reference to the accompanying drawings.

Figure 1:
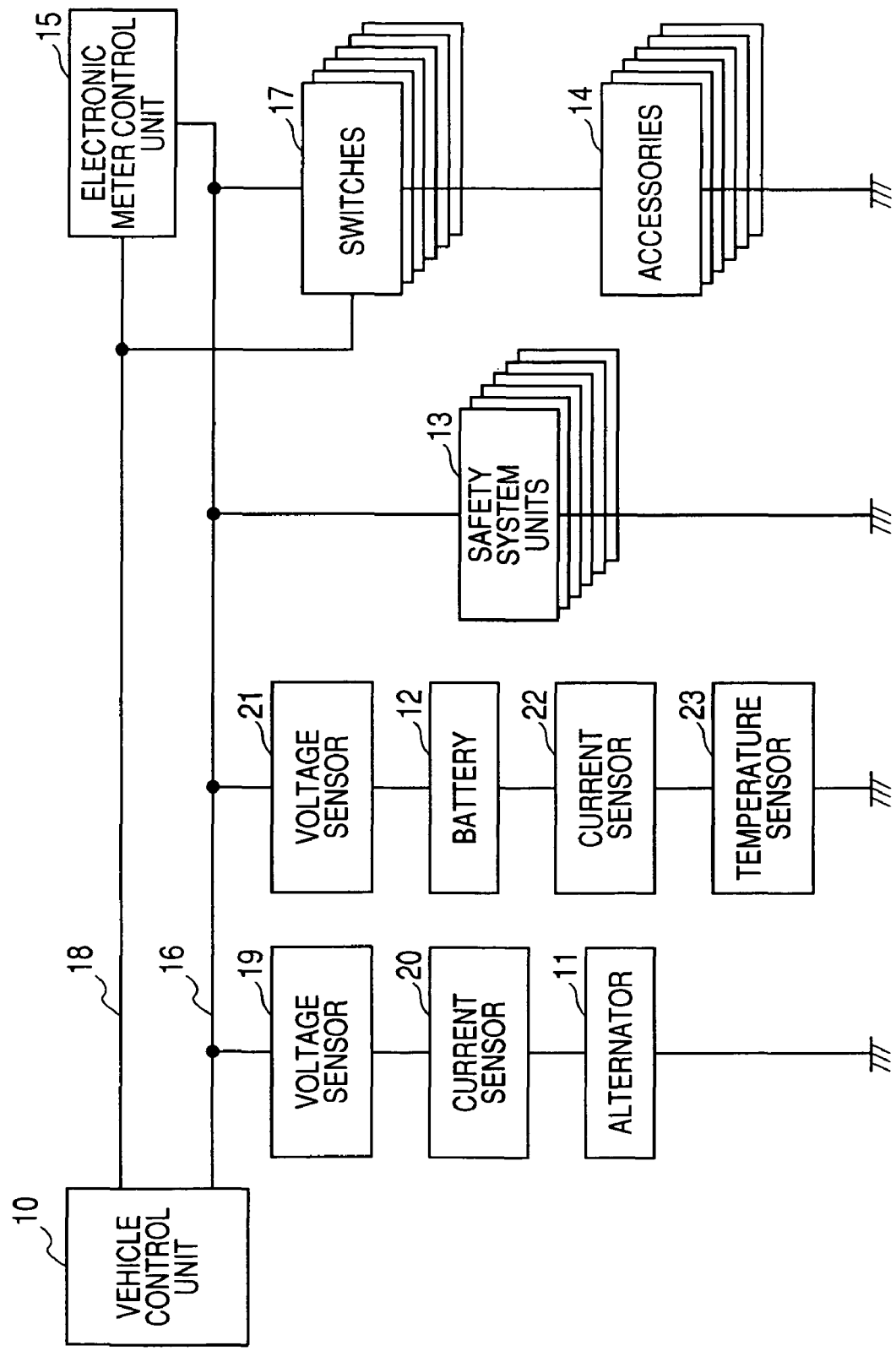
FIG. 1 is a block diagram showing a system configuration of a vehicle control system according to an embodiment of the present invention.

Firstly, a system configuration of a vehicle control system will be described. As shown in FIG. 1, a vehicle control system includes a vehicle control unit 10 having an economical running function, and an alternator 11 for generating an alternating current while an engine is in operation, a battery 12 for providing a power supply to electric equipments, safety system units 13, accessories 14 and an electronic meter control unit 15 are connected to the vehicle control unit 10 via a power supply line 16. The accessories 14 are connected to the power supply line 16 via switches 17 which can interrupt a power supply to the accessories 14. In addition, the switches 17 and the electronic meter control unit 15 are connected to the vehicle control unit 10 via a signal line 18.

A voltage sensor 19 for detecting a voltage and a current sensor 20 for detecting a current are provided on the alternator 11, and output terminals of the voltage sensor 19 and the current sensor 20 are connected to the vehicle control unit 10, although not so illustrated in the figure. In addition, a voltage sensor 21, a current sensor 22 and a temperature sensor 23 for detecting a temperature are provided on the battery 12, and although not so illustrated in the figure, output terminals of the voltage sensor 21, the current sensor 22 and the temperature sensor 23 are connected to the vehicle control unit 10.

The safety system units 13 and the accessories 14 are included in a plurality of electric equipments which are installed on a vehicle. The safety system units 13 are electric equipments which are related to the safety of the vehicle of the vehicle, and for example, electronic control units such as an engine control system and a brake control system are raised. The accessories 14 are the other pieces of electronic equipment than the safety system units 13, and for example, a car audio system and a car navigation system are raised.

In this vehicle control unit 10, an available current value which the battery 12 can supply to the electric equipments is calculated based on detection signals by the voltage sensor 21, current sensor 22 and temperature sensor 23 of the battery 12, and a determination on whether an economical running is permitted or prohibited, a calculation of a generation requiring current value that is to be generated by the alternator 11 and a feed limitation on the accessories 14 are implemented based on the available current value so calculated.

When a feed limitation on some of the accessories 14 is implemented, the corresponding switches 17 and the electronic meter control unit 15 receive a feed limitation signal which signals the implementation of a feed limitation on the relevant accessories 14 from the vehicle control unit 10 via the signal line 18, and as this occurs, the corresponding switches 17 cut off the power supply line 16, and the electronic meter control unit 15 notifies the user of those of the accessories 14 on which the feed limitation is implemented.

In addition, although not shown, the vehicle control unit 10 receives from other electronic control units or sensors signals which represent a running condition of the vehicle including an idle state, accelerated state, steady-speed running state or decelerated state and engine speeds in the relevant vehicle running conditions.

Figure 2:
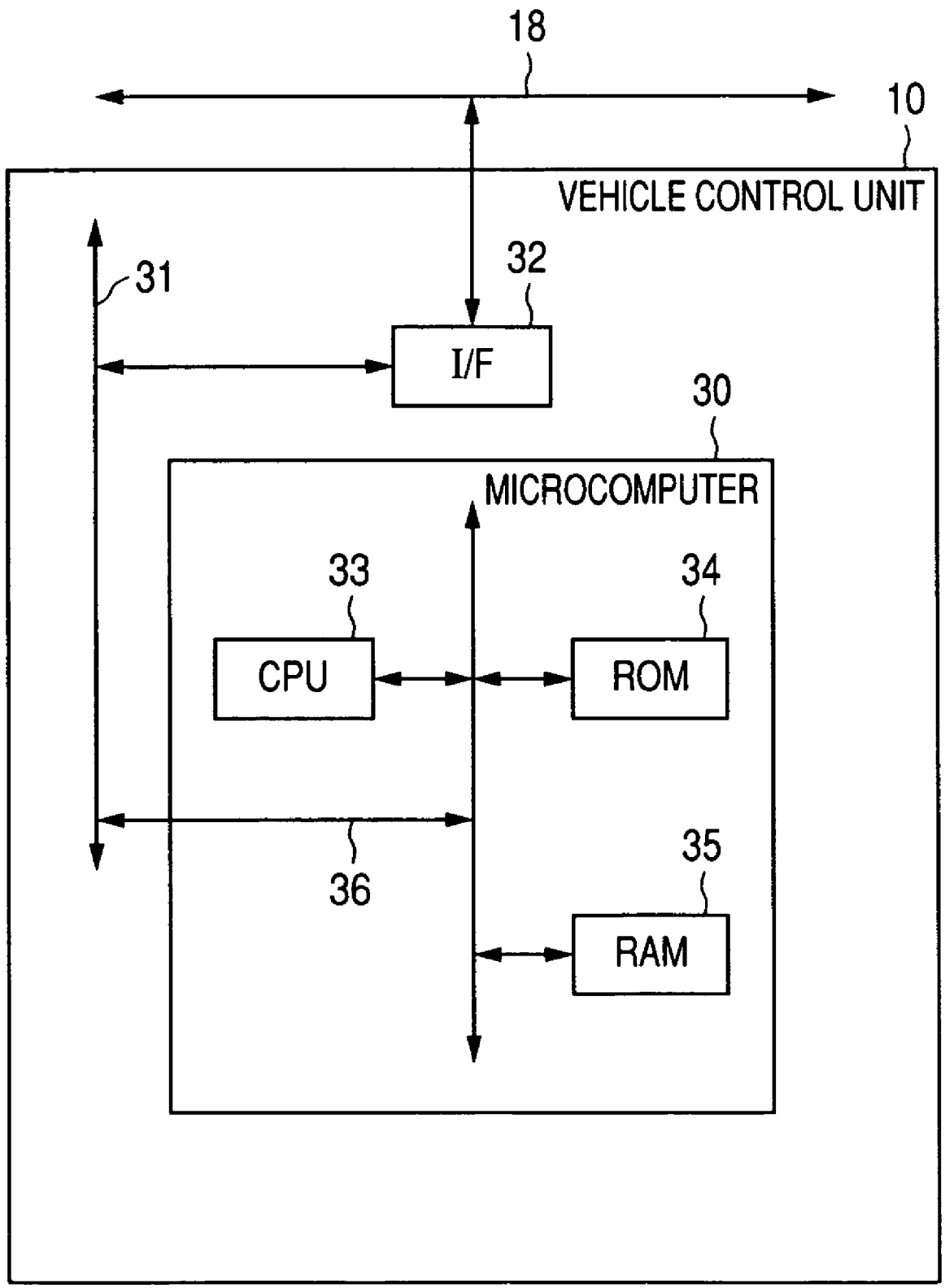
FIG. 2 is a block diagram showing a hardware configuration of a vehicle control unit according to the embodiment.

Next, a hardware configuration of the vehicle control unit 10 will be described. As shown in FIG. 2, the vehicle control unit 10 includes a microcomputer 30, and this microcomputer 30 is connected to a bus 31 within the vehicle control unit 10 and is then connected to the external signal line 18 via an I/F interface) 32.

The microcomputer 30 has a CPU (Central Processing Unit) 33, and a ROM (Read Only Memory) 34 and a RAM (Random Access Memory) 35 are connected to the CPU 33 via a bus 36 within the microcomputer 30. In addition, the bus 31 is connected to the CPU 33 via the bus 36.

The CPU 33 controls the whole of the vehicle control unit 10. At least a part of a program of an OS (Operating System) and an application program which are executed by the CPU 33 is temporarily stored in the RAM 35. In addition, various types of data which are necessary for processing by the CPU 33 are stored in the RAM 35. The program of the OS and the application program are stored in the ROM 34.

This application program contains programs for an available current value calculation process, an economical running control process, an alternator generation commanding process and a feed limiting process which are executed by the vehicle control unit 10.

Figure 3:
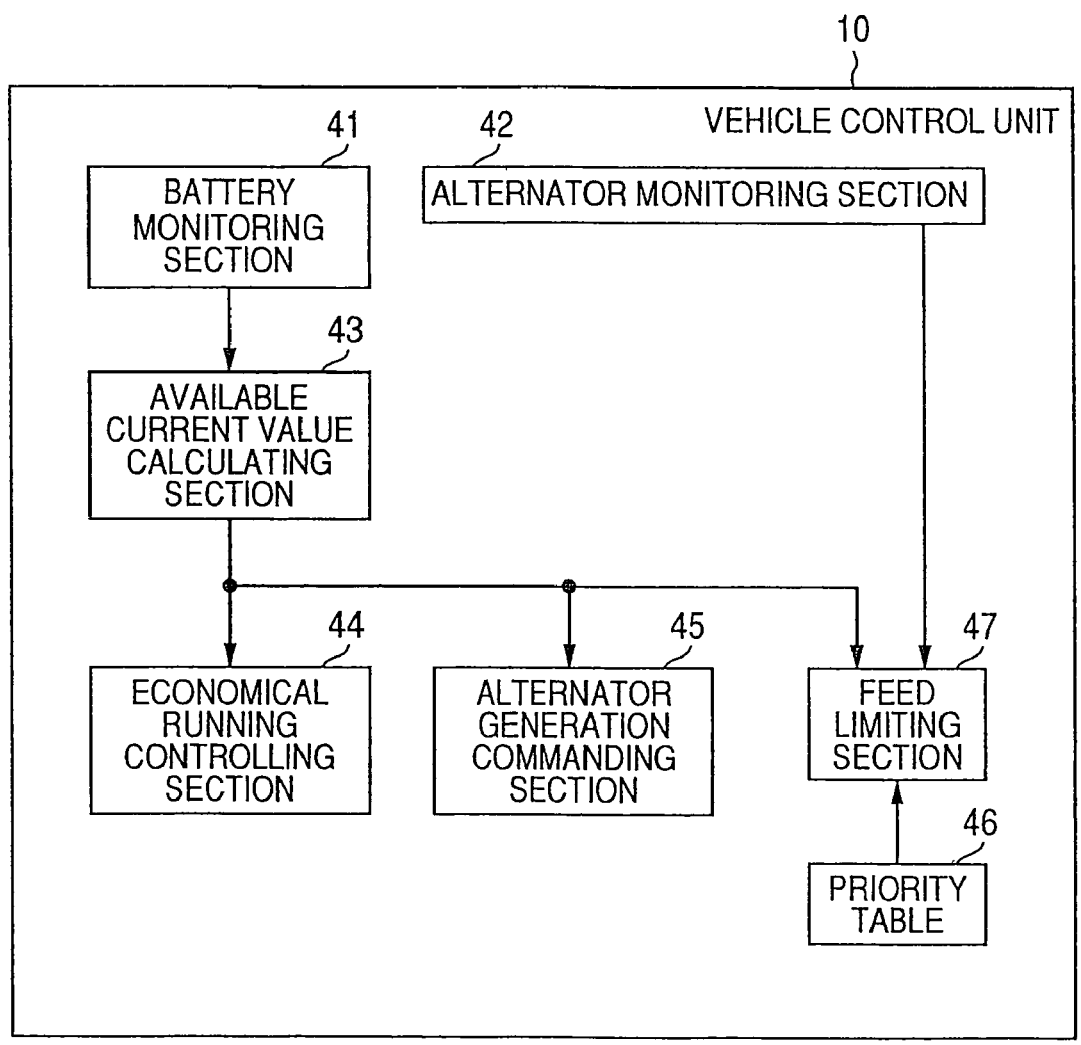
FIG. 3 is a block diagram showing a functional configuration of the vehicle control unit.

Next, a functional configuration of the vehicle control unit 10 will be described which is realized by the hardware configuration shown in FIG. 2. As shown in FIG. 3, the vehicle control unit 10 includes a battery monitoring section 41, an alternator monitoring section 42, an available current value calculating section 43, an economical running controlling section 44, an alternator generation commanding section 45, a priority table 46 and a feed limiting section 47.

The battery monitoring section 41 samples voltage values, current values and fluid temperatures of the battery 12 which are detected by the voltage sensor 21, the current sensor 22 and the temperature sensor 23, respectively. In addition, the alternator monitoring section 42 samples voltage values and current values of the alternator 11 which are detected by the voltage sensor 19 and the current sensor 20, respectively.

The available current value calculating section 43 calculates an available current value which the battery 12 can supply to the electric equipments by calculating an internal resistance value of the battery 12 from voltage values and current values of the battery 12 which have been sampled by the battery monitoring section 41. In addition, the available current value calculating section 43 appropriately updates the available current value based on a variation in the fluid temperatures of the battery 12 which have been sampled by the battery monitoring section 41.

The economical running controlling section 44 determines whether it permits or prohibits an economical running based on the available current value. Based on the result of this determination, the economical running control unit 44 prohibits an economical running when a current value that is supplied to the safety system units 13 and the accessories 14 from the battery 12 is insufficient and permits the economical running when the current value is sufficient.

The alternator generation commanding section 45 calculates a generation requiring current value that is generated by the alternator 11 in order to secure a sufficient current value that is supplied to the safety system units 13 and the accessories 14 based on the available current value and issues a generation command to the alternator so as to obtain at least a generation of an electric current which corresponds to the generation requiring current value.

The priority table 46 stores relations between priorities in feeding and consumed current values of the accessories 14 in the ROM 34.

The feed limiting section 47 calculates a feed limiting current value which is an insufficient portion of a current value that is supplied to the safety system units 13 and the accessories 14 based on a current value of the alternator 11 which has been sampled by the alternator monitoring section 42 and the available current value resulting after the current value that was to be supplied to the safety system units 13 and the accessories 14 was determined insufficient. The feed limiting section 47 identifies a minimum number of feed limitation candidates from the accessories 14 based on the feed limiting current value so calculated which are of low priories in feeding and whose consumed current values amount to at least a value which exceeds the feed limiting current value by referring to the priority table 46, implements a feed limitation on the feed limitation candidate accessories 14 by interrupting the switches 17 therefor, and notifies the user of the implementation of the feed limitation on the relevant accessories 14 via the electronic meter control unit 15.

Note that the vehicle control unit 10 may be integrated with an engine control unit which controls the engine. In addition, the invention may be carried out by configuring the economical running control unit 44 itself as a separate unit and through communication between the unit and the vehicle control unit 10.

Figure 4:
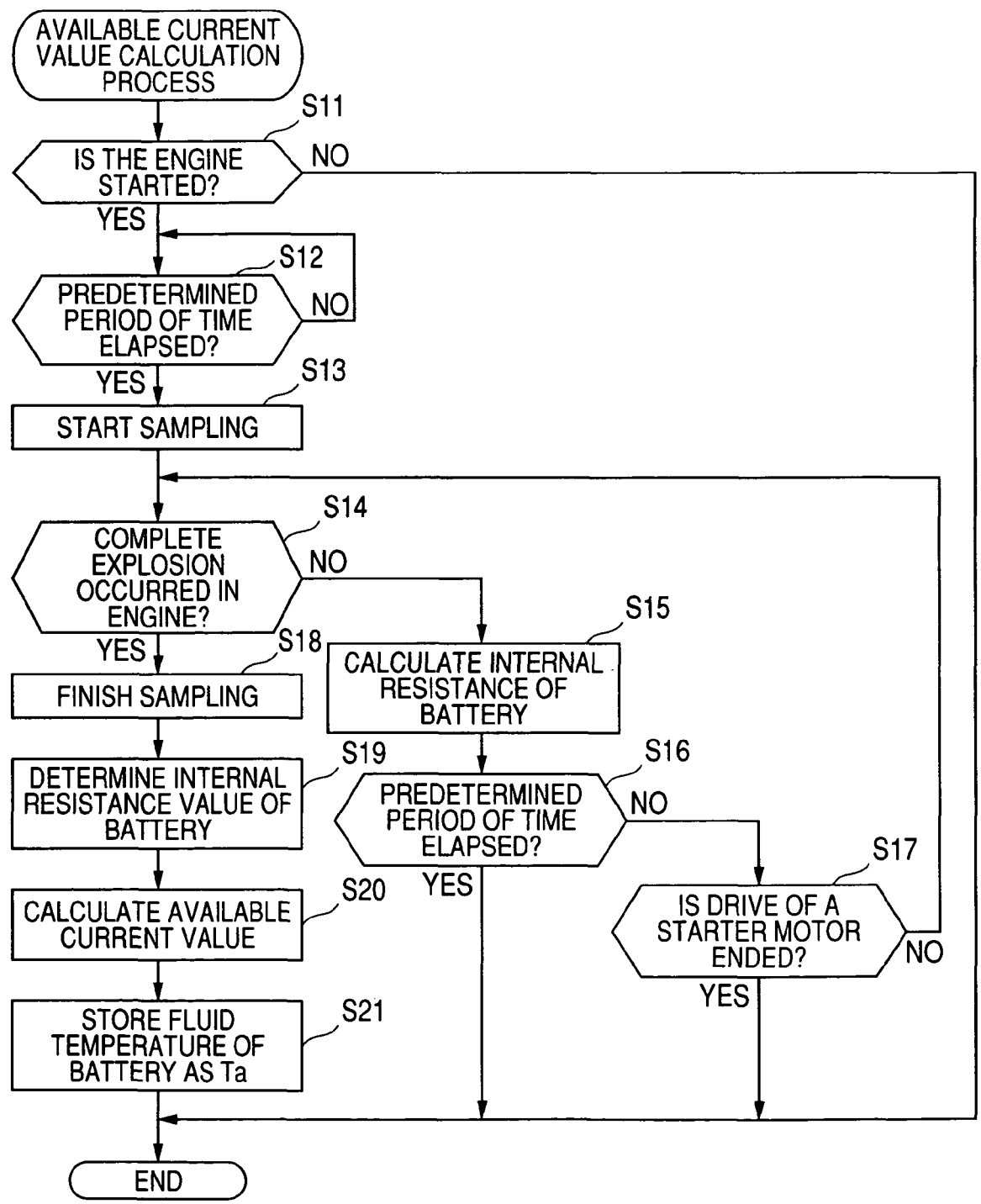
FIG. 4 is a flowchart showing a calculating process of an available current value according to the embodiment.

Next, a process carried out by the available current value calculating section 43 will be described. As shown in FIG. 4, the available current value calculating section 43 executes an available current value calculating process program to implement the process which follows the following steps.

[Step S11] The CPU 33 determines whether or not the engine has been started by driving a starter motor. If the engine has been so started, the process proceeds to Step S12, whereas if the engine has not been so started, the available current value calculating process ends.

[Step S12] The CPU 33 determines whether or not a predetermined period of time has elapsed since the engine was started. This is because since a starter motor rush current flows in an initial stage of the start of the engine, in order not to sample this rush current as a current value of the battery 12, a wait of the predetermined period of time is necessary. If the predetermined period of time has elapsed, the process proceeds to Step S13, whereas if the predetermined period of time has not yet elapsed, the process in this step S12 is repeated.

[Step S13] The CPU 33 starts sampling a voltage value and a current value of the battery 12 which have been detected by the voltage sensor 21 and the current sensor 22, respectively.

[Step S14] The CPU 33 determines whether or not a complete explosion has occurred in the engine. If the complete explosion has occurred, the process proceeds to Step S18, whereas if no complete explosion has occurred in the engine, the process proceeds to Step S15.

[Step S15] The CPU 33 calculates an internal resistance value of the battery 12 by calculating a variation in voltage value and a variation in current value from a voltage value and a current value of the battery 12 which have been sampled this time and a voltage value and a current value of the battery 12 which were sampled previously and then dividing the voltage value variation by the current value variation.

[Step S16] The CPU 33 determines whether or not a predetermined period of time has elapsed since the engine was started. If no complete explosion has occurred in the engine although the predetermined period of time has elapsed since the engine was started, since there exists a possibility of the occurrence of a trouble of a malfunction of the starter motor or the like, the available current value calculating process ends here. On the other hand, if the predetermined period of time has not yet elapsed since the engine was started, the process proceeds to Step S17.

[Step S17] The CPU 33 determines whether or not the starting of the engine by driving the starter motor has been completed. If the start-up of the engine through the drive of the starter motor has ended although the engine was started with no complete explosion occurring in the engine, since there exists a possibility of the occurrence of a trouble of a malfunction of the starter motor or the like, the available current value calculating process ends here. On the other hand, if the start-up of the engine through the drive of the starter motor has not yet been completed, the process returns to Step S14.

[Step S18] The CPU 33 finishes sampling a voltage value and a current value of the battery 12. Here, internal resistance values of the battery 12 have been calculated from the voltage values and current values of the battery 12 which had been sampled during the time from the sampling was started until the complete explosion occurred in the engine.

[Step S19] The CPU 33 determines on the internal resistance value of the battery 12. This internal resistance value is a mean value, a maximum value or a most frequently occurring value of the internal resistance values of the battery 12 which were calculated through the process in Step S15. Note that the internal resistance value of the battery may be determined after off-values among the internal resistance values of the battery are deleted.

[Step S20] The CPU 33 calculates an available current value which the battery 12 can supply by subtracting a discharge termination voltage value of the battery 12 at which the battery 12 cannot be discharged any more from the voltage value of the battery 12 and dividing the result of the subtraction by the internal resistance value of the battery 12.

[Step S21] The CPU 33 stores a fluid temperature of the battery which is detected by the temperature sensor 23 as Ta.

Figure 5:
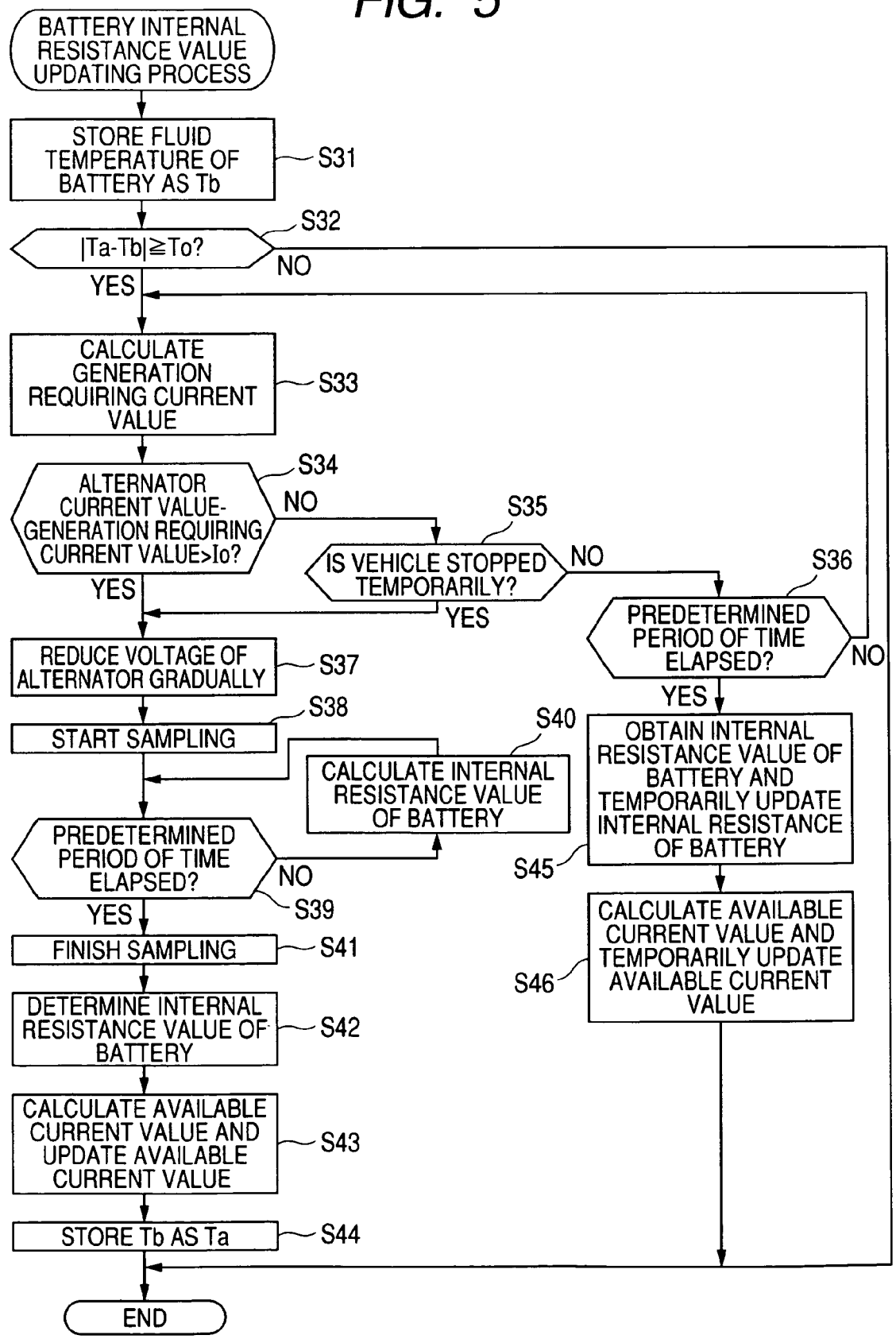
FIG. 5 is a flowchart showing updating process of a battery internal resistance value according to the embodiment.

Next, a process will be described in which the internal resistance value of the battery 12 is updated by the available current value calculating section 43. As shown in FIG. 5, the available current value calculating section 43 executes the available current value calculating process program to implement the process which follows the following steps.

[Step S31] The CPU 33 stores a fluid temperature of the battery 12 which is detected by the temperature sensor 23 as Tb.

Figures 6A, 6B:
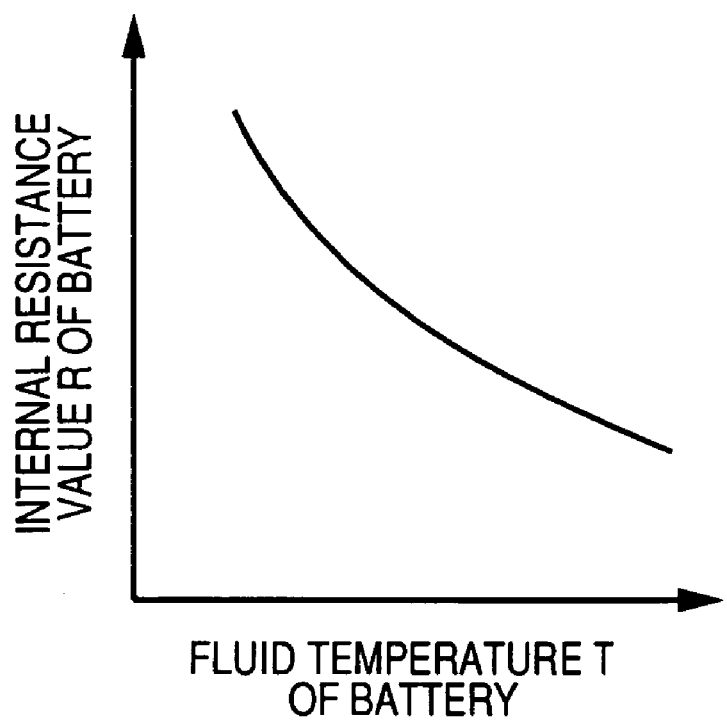
FIG. 6A is a diagram showing the battery internal resistance value related to fluid temperature.
FIG. 6B is a table showing the battery internal resistance values related to fluid temperatures.

[Step S32] The CPU 33 determines whether or not a difference between the previous fluid temperature Ta of the battery 12 and the current fluid temperature Tb of the battery 12 is equal to or greater than a predetermined value To. If the difference is equal to or greater than the predetermined value To, the process proceeds to Step S33, whereas if the difference is less than the predetermined value To, the battery internal resistance value updating process ends. Here, since the battery 12 has a temperature property in which its internal resistance value changes as the fluid temperature changes, the internal resistance value has changed by such an extent that the fluid temperature has changed by comparing the stored fluid temperature and a fluid temperature that resulted thereafter. Namely, as is shown in FIG. 6A, the battery 12 has a temperature property in which the internal resistance value R decreases as the fluid temperature T increases, and as is shown in FIG. 6B, this temperature property is stored in the ROM 34 in the form of a table in which temperatures T and internal resistance values R of the battery 12 are related to each other.

[Step S33] The CPU 33 calculates a generation requiring current value which is to be generated by the alternator 11 by subtracting the available current value from a sum of necessary current values which are necessary for the safety system units 13 and consumed current values which are consumed or used by the accessories 14.

[Step S34] The CPU 33 determines whether or not the current value of the alternator 11 is larger by a predetermined value Io or more than the generation requiring current value. If the current value of the alternator 11 is so larger than the generation requiring current value, the process proceeds to Step S37, whereas if the current value is smaller than the generation requiring current value, the process proceeds to Step S35.

[Step S35] The CPU 33 determines whether or not the vehicle is stopped temporarily. If the vehicle is so stopped, the process proceeds to Step S37, whereas if the vehicle is not stopped temporarily, the process proceeds to Step S36.

[Step S36] The CPU 33 determines whether or not a predetermined period of time has elapsed since the difference between the fluid temperature Ta and the fluid temperature Tb of the battery 12 became the predetermined value To or greater. If the predetermined period of time has elapsed, the process proceeds to Step S45, whereas if the predetermined period of time has not yet elapsed, the process returns to Step S33.

[Step S37] The CPU 33 gradually reduces the voltage value of the alternator 11 by causing the alternator generation commanding section 45 to control the adjusting voltage value of the alternator 11, so as to cause the battery 12 to be discharged by such an extent that the voltage value of the alternator 11 has so decreased to thereby cause the voltage value and current value of the battery 12 to change.

[Step S38] The CPU 33 starts sampling a voltage value and a current value of the battery 12 which have been detected by the voltage sensor 21 and the current sensor 22, respectively on a predetermined cycle.

[Step S39] The CPU 33 determines whether or not a predetermined period of time has elapsed since the sampling was started. If the predetermined period of time has so elapsed, the process proceeds to Step S41, whereas if the predetermined period of time has not yet elapsed, the process proceeds to Step S40.

[Step S40] The CPU 33 calculates an internal resistance value of the battery 12 by calculating a variation in voltage value and a variation in current value from a voltage value and a current value of the battery 12 which have been sampled this time and a voltage value and a current value of the battery 12 which were sampled previously and then dividing the voltage value variation by the current value variation.

[Step S41] The CPU 33 finishes sampling the voltage value and current value of the battery 12. Here, internal resistance values of the battery 12 have been calculated from the voltage values and current values of the battery 12 which had been sampled for the duration that a predetermined period of time had elapsed since the voltage value of the alternator 11 was started to be gradually reduced.

[Step S42] The CPU 33 determines on the internal resistance value of the battery 12. This internal resistance value is a mean value, a maximum value or a most frequently occurring value of the internal resistance values of the battery 12 which were calculated through the process in Step S40.

Note that the internal resistance value of the battery may be determined after off-values among the internal resistance values of the battery are deleted.

[Step S43] The CPU 33 calculates an available current value which the battery 12 can supply by subtracting the discharge termination voltage value from the voltage value of the battery 12 and then dividing the result of the subtraction by the internal resistance value of the battery 12 and updates the available current value of the battery 12.

[Step S44] The CPU 33 stores the fluid temperature Tb of the battery 12 which resulted when the latest internal resistance value of the battery 12 was calculated as a fluid temperature Ta.

[Step S45] The CPU 33 obtains an internal resistance value of the battery 12 which corresponds to the fluid temperature of the battery 12 by referring to the table which is stored in the ROM 34 in advance and temporarily updates the internal resistance value of the battery 12.

[Step S46] The CPU 33 calculates an available current value which the battery 12 can supply by subtracting the discharge termination voltage value from the voltage value of the battery 12 and then dividing the result of the subtraction by the internal resistance value of the battery 12 and temporarily updates the available current value of the battery 12. The processes in Steps S45 and S46 are such as to be carried out in an attempt to temporarily update the available current value based on a theoretical internal resistance value instead of using an actual one when the updating of the internal resistance value of the battery 12 cannot be implemented although there is occurring a change in fluid temperature of the battery 12. Namely, for example, when the vehicle is driven on a highway over a long period of time at a constant speed, since the engine speed is constant, there occurs little change in generation amount of the alternator 11. Since this makes it difficult for the current value of the alternator 11 to become large and the vehicle is not stopped, the process is made difficult to proceed to Steps S42 and S43, whereby the updating of the internal resistance value and the available current value is made difficult to take place. In order to avoid the situation in which the internal resistance value and the available current values are not updated, the theoretical internal resistance value is obtained so as to temporarily update the available current value in the processes of Steps S45 and S46. Note that in the event that the process can proceed to Step S42 after the theoretical internal resistance value was obtained to update the available current value temporarily, the available current value is to be updated by an actual internal resistance value.

Figure 7:
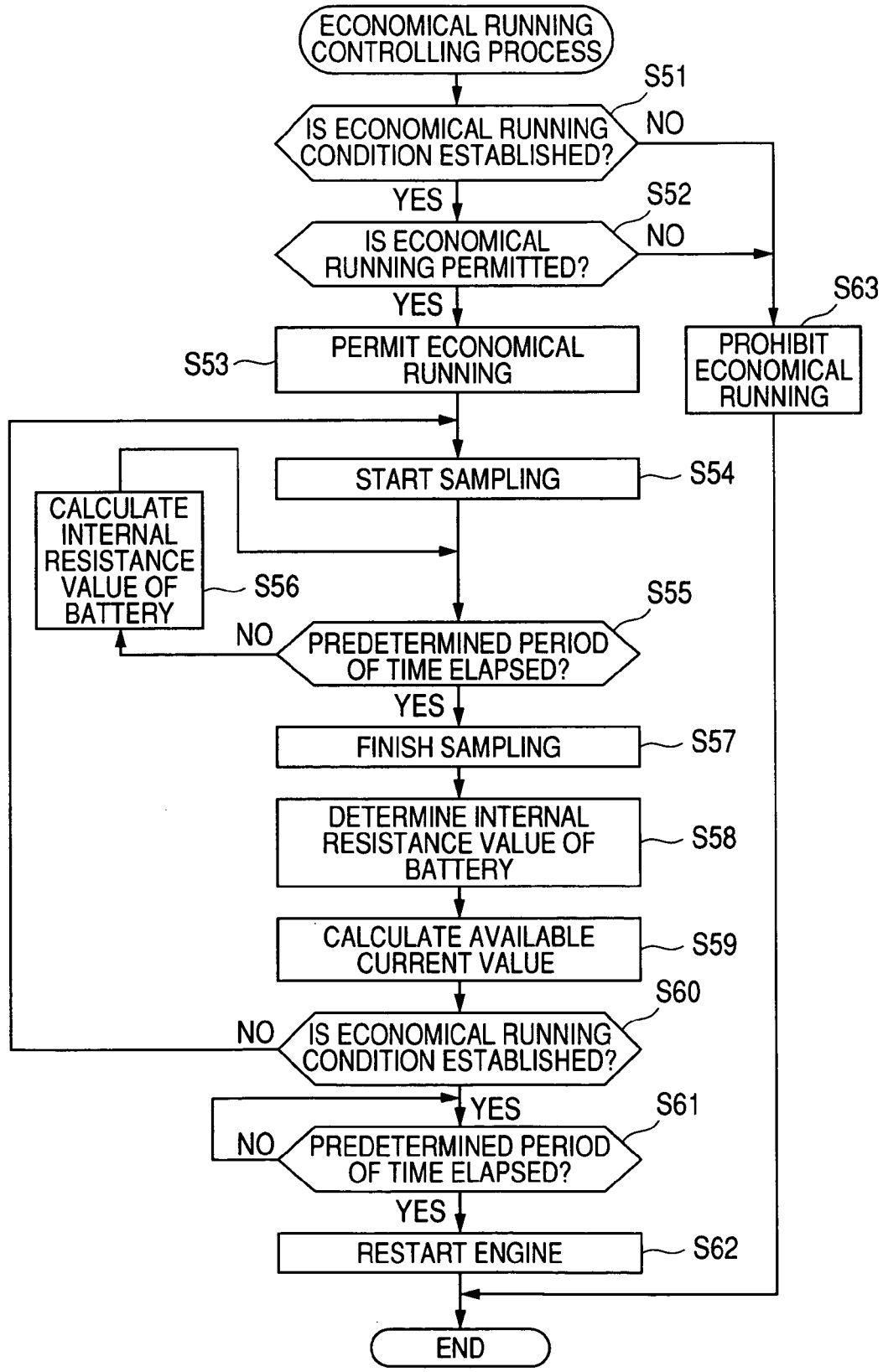
FIG. 7 is a flowchart showing an economical running controlling process.

Next, an economical running control process by the economical running controlling section 44 will be described. As shown in FIG. 7, the economical running controlling section 44 executes an economical running controlling process program to repeatedly carry out the process which follows the following steps.

[Step S51] The CPU 33 determines whether or not an economical running condition has been established. This economical running condition is established, for example, when the brake pedal is depressed to apply the brakes so as to stop the vehicle temporarily after it has been started to run, whereby the running conditions of the vehicle is being in an idle state with the vehicle speed of 0. If the economical running condition has been established, the process proceeds to Step S52, whereas if the condition has not been established, the process proceeds to Step S63.

[Step S52] The CPU 33 determines whether it permits or prohibits an economical running. The CPU 33 permits the economical running when the available current value is larger than a sum of the necessary current values for the safety system units 13 and the consumed current values by the accessories 14, and the process proceeds to Step S53, whereas when the available current value is smaller than the sum, the CPU 33 prohibits the economical running, and the process proceeds to Step S63.

[Step S53] The CPU 33 permits and implements the economical running.

[Step S54] The CPU 33 starts sampling of voltage values and current values of the battery 12 which are detected by the voltage sensor 21 and the current sensor 22, respectively, on a predetermined cycle.

[Step S55] The CPU 33 determines whether or not a predetermined period of time has elapsed since the economical running was implemented. If the predetermined period of time has elapsed, the process proceeds to Step S57, whereas if the predetermined period of time has not elapsed, the process proceeds to Step S56.

[Step S56] The CPU 33 calculates an internal resistance value of the battery 12 by calculating a variation in voltage value and a variation in current value from a voltage value and a current value of the battery 12 which have been sampled this time and a voltage value and a current value of the battery 12 which were sampled previously and then dividing the voltage value variation by the current value variation.

[Step S57] The CPU 33 finishes sampling voltage values and current values of the battery 12. As this occurs, internal resistance values of the battery 12 have been calculated from the voltage values and current values of the battery 12 which had been sampled for the duration that a predetermined period of time had elapsed since the economical running was started.

[Step S58] The CPU 33 determines on the internal resistance value of the battery 12. This internal resistance value is a mean value, a maximum value or a most frequently occurring value of the internal resistance values of the battery 12 which were calculated through the process in Step S40. Note that the internal resistance value of the battery may be determined after off-values among the internal resistance values of the battery are deleted.

[Step S59] The CPU 33 calculates an available current value which the battery 12 can supply by subtracting the discharge termination voltage value from the voltage value of the battery 12 and then dividing the result of the subtraction by the internal resistance value of the battery 12.

[Step S60] The CPU 33 determines whether or not an economical running prohibiting condition for prohibiting the economical running has been established while the economical running is in operation. If the available current value is smaller than the sum of the necessary current values for the safety system units 13 and the consumed current values by the accessories 14, the economical running prohibiting condition is established, and the process proceeds to Step S61, whereas if the available current value is larger than the sum, the economical running prohibiting condition is not established, and the process returns to Step S54. Note that since the safety system unit such as the ABS is activated in no case while the economical running is in operation, the necessary current value for such a safety system unit can be excluded, and this makes it difficult for the economical running prohibiting condition to be established.

[Step S61] The CPU 33 determines whether or not a predetermined period of time has elapsed since the economical running prohibiting condition was established. If the predetermined period of time has elapsed, the process proceeds to Step S62, whereas if the predetermined period of time has not elapsed, the process in this step S61 is repeated.

[Step S62] The CPU 33 prohibits the economical running and forcibly restarts the engine to start the generation.

[Step S63] When an economical running condition is not established or the economical running is not permitted although the economical running condition is established, the CPU 33 prohibits the economical running.

Figure 8:
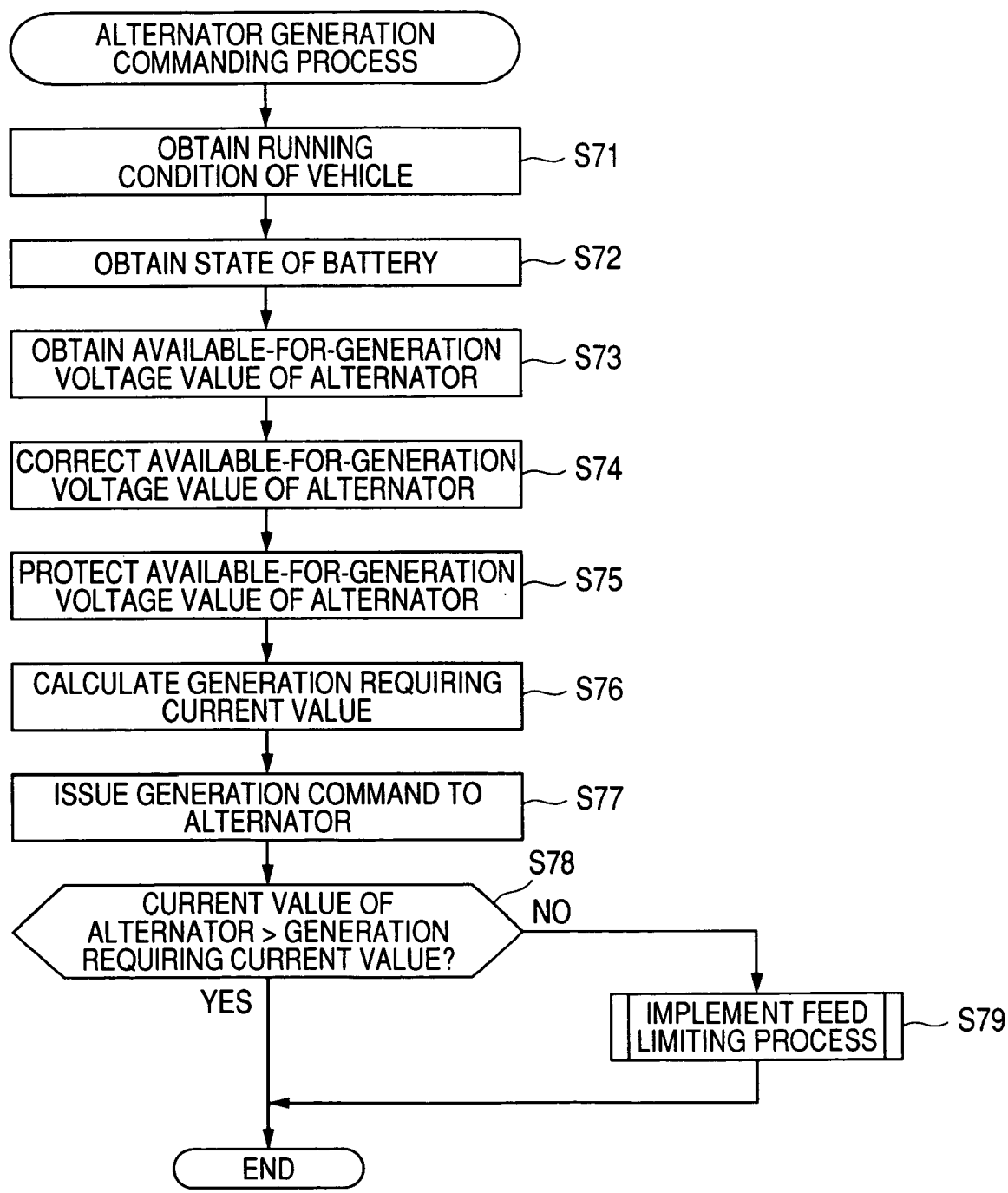
FIG. 8 is a flowchart showing a generation commanding process of issuing a generation command to an alternator.

Next, an alternator generation commanding process by the alternator generation commanding section 45 will be described. When a complete explosion occurs in the engine, the alternator generation commanding section 45 executes an alternator generation commanding process program, as shown in FIG. 8, to repeatedly carry out the process which follows the following steps.

[Step S71] The CPU 33 obtains a state of the vehicle which is informed thereto from other electronic control units or sensors, that is, a running condition of the vehicle which is represented by an idle state, accelerated state, steady-speed running state or decelerated state of the vehicle, as well as an engine speed.

[Step S72] The CPU 33 obtains a state of the battery, that is, a voltage value and a current value of the battery 12 which are detected by the voltage sensor 21 and the current sensor 22, respectively and obtains the internal resistance value of the battery 12 which was calculated by the available current value calculating section 43 in the process in Step S42.

Figure 9:
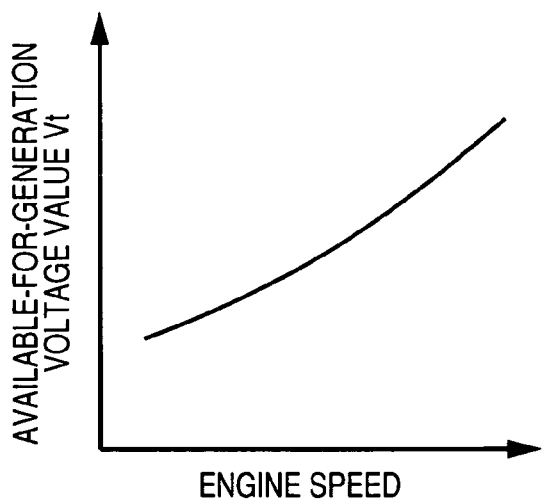
FIG. 9 is a diagram showing an available-for-generation voltage value property relative to engine speed.

[Step S73] The CPU 33 obtains an available-for-generation voltage value which corresponds to an engine speed. As is shown in FIG. 9, since the alternator 11 has a property in which an available-for-generation voltage value Vt which the alternator 11 can generate changes according to engine speeds, the CPU 33 obtains an available-for-generation voltage value Vt which corresponds to the engine speed which was obtained in the process in Step S71 by referring to the ROM 34 which stores the property of the alternator 11.

Figure 10:
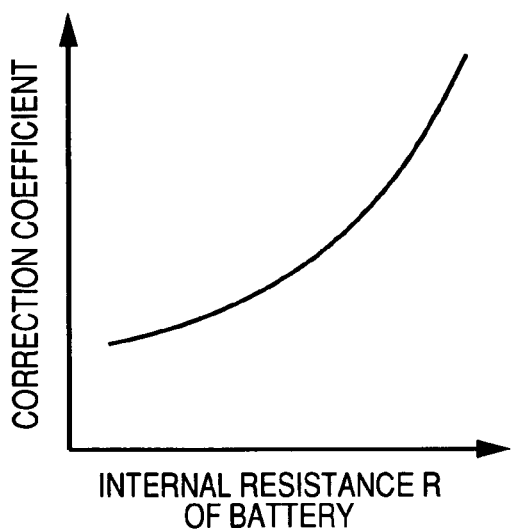
FIG. 10 is a diagram showing a correction coefficient property of an available-for-generation voltage value relative to the internal resistance value of the battery.

[Step S74] The CPU 33 obtains a correction coefficient of the available-for-generation voltage value which corresponds to the internal resistance value of the battery 12 and corrects the available-for-generation voltage value which was obtained in the process in Step S73 by the correction coefficient so obtained. This is because a voltage value to be generated needs to be increased as the internal resistance value of the battery 12 increases even with the same engine speed. The corresponding relationship between the internal resistance value R of the battery 12 and the correction coefficient of the available-for-generation voltage value is such as shown in FIG. 10, and the CPU 33 is designed to obtain a correction coefficient for an available-for-generation voltage value which corresponds to the internal resistance value R of the battery 12 by referring to the ROM 34 which stores the property of the correction coefficient, as shown in FIG. 10.

Figure 11:
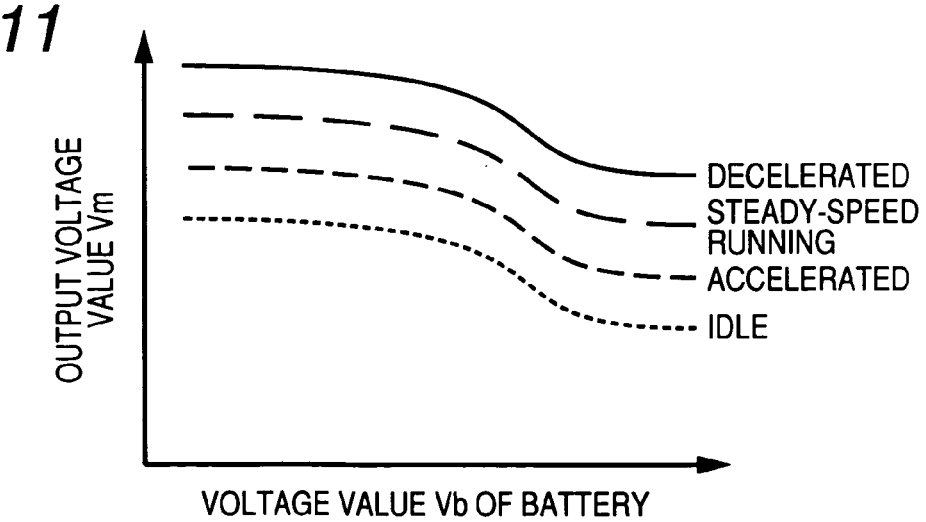
FIG. 11 is a diagram showing an output voltage value property relative to running conditions of a vehicle and the voltage value of the battery.

[Step S75] The CPU 33 protects the available-for-generation voltage value which was calculated in the process in Step S74 by an output voltage value which corresponds to the running condition of the vehicle and the voltage value of the battery 12. Namely, as is shown in FIG. 11, the output voltage value Vm of the alternator 11 may be reduced as the voltage Vb of the battery 12 increases, and furthermore, the output voltage value Vm has a property in which the output voltage value Vm changes according to the running conditions of the vehicle in such a manner as to be increased in the order of an idle, accelerated, steady-speed running and decelerated state of the vehicle. However, since the available-for-generation voltage value that was corrected in the process in Step S74 was calculated irrespective of the property, there may occur a case where the calculated value increases to a very high level, and in such a case, the CPU 33 obtains an output voltage value which corresponds to the running condition of the vehicle and the voltage value Vb of the battery 12 which were both obtained in the process in Step S71 and protects the corrected available-for-generation voltage value by the output voltage value so obtained.

[Step S76] The CPU 33 calculates a generation requiring current value by subtracting the available current value from the sum of the necessary current values for the safety system units 13 and the consumed current values by the accessories 14.

[Step S77] The CPU 33 calculates an adjusting voltage value of the alternator 11 which is equal to or less than the available-for-generation voltage value which was calculated in the process in Step S75 and which can attain at least a generation of the generation requiring current value which was calculated in the process in Step S76 and issues a generation command to the alternator 11.

[Step S78] The CPU 33 determines whether or not the current value of the alternator 11 is larger than the generation requiring current value, in other words, determines whether or not a sum of the available current value and the current value of the alternator is larger than the sum of the necessary current values for the safety system units 13 and the consumed current values by the accessories 14. If the former sum is larger than the latter sum, the alternator generation commanding process ends, whereas the former sum is smaller than the latter sum, the process proceeds to Step S79.

Figure 12:
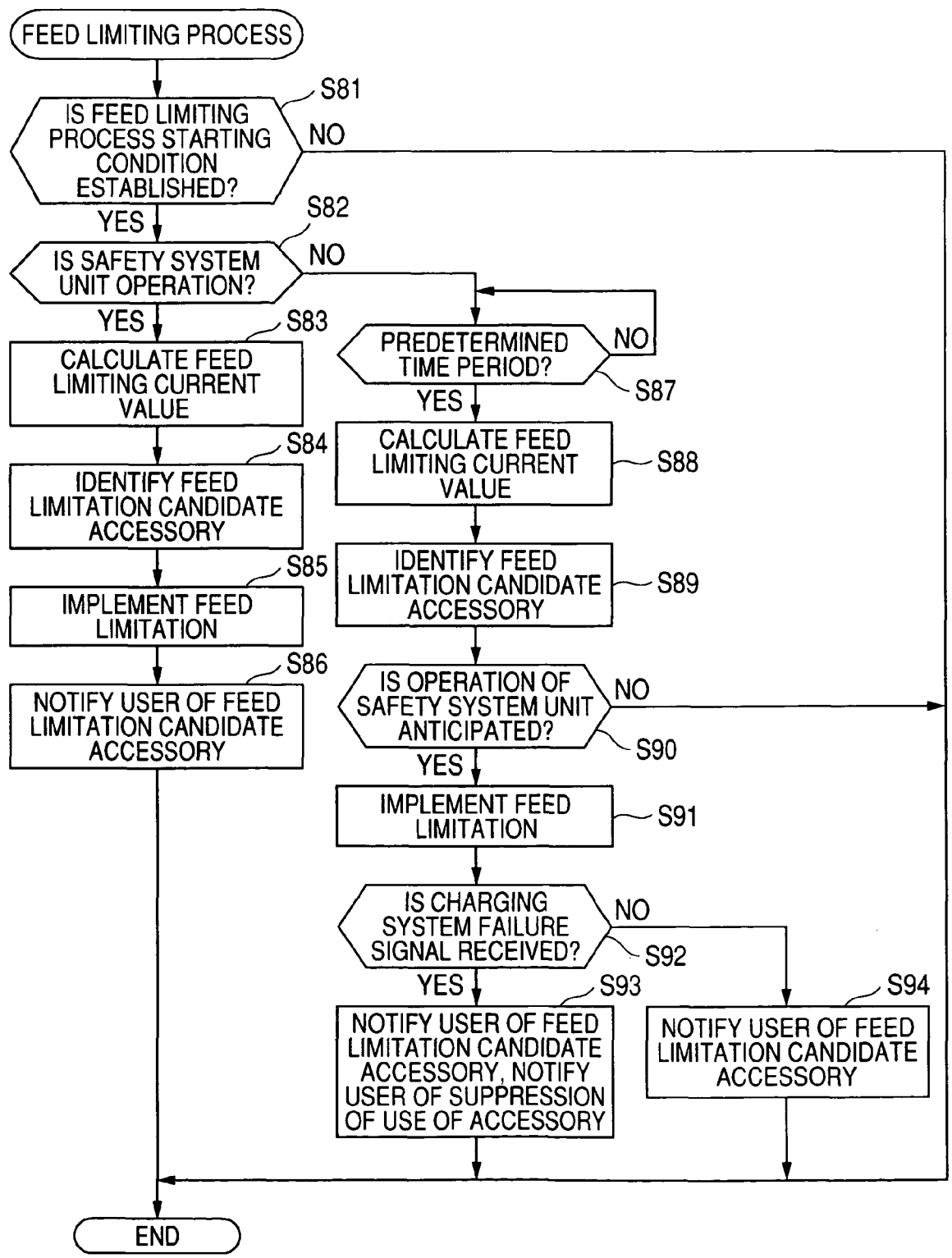
FIG. 12 is a flowchart showing a feed limiting process.

[Step S79] The CPU 33 implements a feed limiting process which will be described by reference to FIG. 12.

Next, a feed limiting process by the feed limiting section 47 will be described. As shown in FIG. 12, the feed limiting section 47 executes a feed limiting process program so as to repeatedly carry out the process which follows the following steps when a complete explosion occurs in the engine.

[Step S81] The CPU 33 determines whether or not a feed limiting process starting condition for starting a feed limiting process has been established. The feed limiting process starting condition is established when the sum of the available current value and the current value of the alternator 11 is smaller than the sum of the necessary current values for the safety system units 13 and the consumed current values by the accessories 14, and the process proceeds to Step S82, whereas if the former sum is larger than the latter sum, the feed limiting process starting condition is not established, whereby the feed limiting process ends.

[Step S82] The CPU 33 determines whether or not the safety system units 13 are in operation. If the units are in operation, the process proceeds to Step S83, whereas if the units are not in operation, the process proceeds to Step S87.

[Step S83] The CPU 33 calculates a feed limiting current value which constitutes an insufficient portion of the current value that is supplied to the electric component by subtracting the consumed current values by some of the safety system units 13 which are in operation from the sum of the necessary current values for the safety system units 13 and the consumed current values of the accessories 14 and further subtracting the sum of the available current value and the current value of the alternator 11 from the remaining of the sum of the necessary current values for the safety system units 13 and the consumed current values of the accessories 14.

[Step S84] The CPU 33 identifies feed limitation candidate accessories. As this occurs, the CPU 33 identifies a minimum number of feed limitation candidate accessories 14 by referring to the priority table 46 as shown in FIG. 13 in such a manner that the minimum number of feed limitation candidate accessories 14 are of low priority in feeding and whose consumed current values amount to at least a value which exceeds the feed limiting current value. This priority table 46 stores corresponding relationships of names, priorities in feeding and consumed current values of the accessories 14, and the priorities are classified into three stages such as, for example, "high," "medium," and "low." For example, in the event that the sum of the available current value and the current value of the alternator is insufficient by "10 A," the CPU 33 refers to the priority table 46 to select only a "JJJ" which is low in priority and which has a consumed current value of "12 A," whereby the number of accessories 14 on which the feed limiting is implemented can be minimized.

[Step S85] The CPU 33 interrupts the switch 17 for the accessory 14 which has been selected as the feed limitation candidate and implements the feed limitation.

[Step S86] The CPU 33 controls the electronic meter control unit 15 to notify the user of the accessory 14 on which the feed limitation is implemented. The user notification is implemented through, for example, illumination of a lamp, display of characters and the like.

[Step S87] The CPU 33 determines whether or not a predetermined period of time has elapsed since the feed limiting process starting condition was established. If the predetermined period of time has elapsed, the process proceeds to step S88, whereas if the predetermined period of time has not elapsed, the process in Step S87 is repeated.

[Step S88] The CPU 33 calculates a feed limiting current value which constitutes an insufficient portion of the current value that is supplied to the electric equipment by subtracting the sum of the available current value and the current value of the alternator 11 from the sum of the necessary current values for the safety system units 13 and the consumed current values by the accessories 14.

[Step S89] The CPU 33 identifies the minimum number of feed limitation candidate accessories 14 on which the feed limiting is implemented by referring to the priority table 46 as shown in FIG. 13 in such a manner that the candidates are low in priority in feeding and a total of the consumed current values thereof exceeds at least the feed limiting current value.

[Step S90] The CPU 33 determines whether or not the operation of the safety system units 13 which are not in operation is anticipated. If the operation is anticipated, the process proceeds to Step S91, whereas if not, the feed limiting process ends. For example, in the case of the safety system unit 13 of the pre-crash safety system, assuming that the pre-crash safety system is activated when the vehicle speed is X km/h or faster and a distance to a preceding vehicle is Y m, an operation of the pre-crash safety system is anticipated when the vehicle speed is X km/h or faster and the distance to the preceding vehicle is Z m which is longer than Y m.

[Step S91] The CPU 33 cuts off the switch 17 for the accessory 14 which is selected as the feed limitation candidate accessory and implements the feed limitation. For example, since, in the event that the vehicle runs Z m after the operation of the pre-crash safety system was antici-pated in the process in Step S90, the pre-crash safety system is activated in an ensured fashion, the feed limitation is implemented on the accessory 14 in the process in Step S91 in preparation for the anticipated activation of the pre-crash safety system. Here, in the event that the safety system unit 13 is in operation, a feed limitation is implemented on the accessory 14 immediately, whereas if the safety system unit 13 is not in operation, the feed limitation on the accessory 14 is implemented when an operation of the safety system unit 13 is anticipated after a predetermined period of time has elapsed.

[Step S92] The CPU 33 monitors a predetermined terminal of the alternator 11 and determines whether or not a charging system failure signal which signals a failure of the charging system has been received from the alternator 11. If a charging system failure signal is received with the charging system failing, the process proceeds to Step S93, whereas if no charging system failure signal has been received because the charging system does not fail, the process proceeds to Step S94.

[Step S93] The CPU 33 controls the electronic meter control unit 15 to notify the user of the accessory 14 on which the feed limitation is implemented. In addition, since the failure of the charging system is confirmed in the process in Step S92, the CPU 33 controls the electronic meter control unit 15 to notify the user that the use of the accessories 14 be suppressed because there will be an anticipated shortage in current value to be supplied in the future due to the failure of the charging system.

[Step S94] The CPU 33 controls the electronic meter control unit 15 to notify the user of the accessory 14 on which the feed limitation is implemented.

What is claimed is:

1. A vehicle control unit adapted to be mounted on a vehicle having a battery which supplies electric power to electric equipments of the vehicle and an alternator which generates the electric power and charges the battery when an engine of the vehicle is operated, the vehicle control unit, when a program stored in a non-transitory storage medium is executed, functions as:
    an economical running control section, operable to perform an economical running in which the engine is automatically stopped when the vehicle is in a predetermined engine stopping condition and the engine is automatically restarted when the vehicle is in a predetermined engine restarting condition;
    a calculate section, operable to calculate an available current value which is available to supply to the electric equipments from the battery; and
    a feed limiting section, operable to limit to supply the electric power to the electric equipments from the battery, wherein:
    the economical running control section controls the economical running based on a total value of necessary current values which are necessary for the respective electric equipments and the available current value; and
    the feed limiting section limits to supply the electric power to the electric equipments from the battery based on the total value of the necessary current values and a sum of the available current value and a generated current value of the alternator.

2. A vehicle control unit as set forth in claim 1, wherein:
    the calculate section calculates the available current value based on a voltage value of the battery and an internal resistance of the battery.

3. A vehicle control unit as set forth in claim 2, wherein:
the calculate section calculates the internal resistance of the battery based on voltage values of the battery and current values of the battery which are measured at every predetermined time period from starting the engine to completely exploding the engine.

4. A vehicle control unit as set forth in claim 3, wherein:
the calculate section calculates the internal resistance of the battery only in a case where the engine completely is exploded within a predetermined time from starting the engine.

5. A vehicle control unit as set forth in claim 1, wherein:
the economical running control section determines whether the economical running is performed or not at every predetermined time period when the economical running section performs the economical running.

6. A vehicle control unit as set forth in claim 5, wherein:
the economical running control section determines whether the economical running is performed or not based on at least the total value of the necessary current values which excepts a necessary current value of a electric equipment which is not used when the vehicle is stopped.

7. A vehicle control unit as set forth in claim 5, wherein:
the economical running control section restarts the engine in a case where a predetermined time elapses when the economical running is performed in a state that the total value of the necessary current values are greater than the available current value.

8. A vehicle control unit as set forth in claim 1, further functioning as:
a power generation directive section, operable to calculate an adjusting voltage value for adjusting a voltage value of the alternator and to direct the alternator to generate an amount of the electric power greater than an amount obtained by subtracting the available current value from the total of the necessary current values based on the adjusting voltage value.

9. A vehicle control unit as set forth in claim 8, wherein:
the power generation directive section guards the adjusting voltage value by a maximum voltage value which the alternator generates according to running conditions of the vehicle and a voltage value of the battery.

10. A vehicle control unit as set forth in claim 1, wherein:
the vehicle control unit includes a priority table which indicates a priorities of the respective electric equipments in which the electric power is supplied to the respective electric equipments from the battery, and in a case where the feed limiting section predicts a state that the total of the necessary current value is greater than the sum of the available current value and the generated current value of the alternator, the feed limiting section calculates a feed limiting current value obtained by subtracting the sum of the available current value and the generated current value of the alternator from the total value of the necessary current values, and specifies an feed limiting equipment based on the priority table in a manner that the total of the necessary current value except a current value of the feed limiting equipment is greater than the feed limiting current value.

11. A vehicle control unit as set forth in claim 1, wherein:
the feed limiting section limits to supply the electric power to the electric equipments from the battery in a case where the feed limiting section predicts a state that the total of the necessary current value is greater than the sum of the available current value and the generated current value of the alternator when the feed limiting section predicts the use of a electric equipment as a safety system unit, which is not used.

12. A vehicle control unit as set forth in claim 1, wherein:
the feed limiting section notifies a user of a failure of a charging system of the vehicle in a case where the failure of the charging system occurs.

13. A vehicle control method for controlling a vehicle having a battery which supplies electric power to electric equipments of the vehicle and an alternator which generates the electric power and charges the battery when an engine of the vehicle is operated, the vehicle including an economical running control section operable to perform an economical running in which the engine is automatically stopped when the vehicle is in a predetermined engine stopping condition and the engine is automatically restarted when the vehicle is in a predetermined engine restarting condition, the vehicle control method comprising:
calculating an available current value which is available to supply to the electric equipments from the battery;
controlling the economical running based on a total value of necessary current values which are necessary for the respective electric equipments and the available current value; and
limiting to supply the electric power to the electric equipments from the battery based on the total value of the necessary current values and a sum of the available current value and a generated current value of the alternator.

* * * * *